United States Patent
Vera et al.

(10) Patent No.: US 9,568,383 B2
(45) Date of Patent: Feb. 14, 2017

(54) TESTING APPARATUS, SYSTEMS AND METHODS FOR STATICALLY DETERMINING FREE PLAY OF AIRCRAFT CONTROL SURFACES

(71) Applicant: EMBRAER S.A., São José dos Campos (BR)

(72) Inventors: Rômulo Vinicius Vera, São José dos Campos (BR); Alexandre Alves, São José dos Campos (BR); Decio Oliveira, São José dos Campos (BR)

(73) Assignee: EMBRAER S.A., São José dos Campos (BR)

( * ) Notice: Subject to any disclaimer, the term of this patent is extended or adjusted under 35 U.S.C. 154(b) by 255 days.

(21) Appl. No.: 14/456,359

(22) Filed: Aug. 11, 2014

(65) Prior Publication Data

US 2016/0041050 A1 Feb. 11, 2016

(51) Int. Cl.
*G01L 5/22* (2006.01)
*G01B 21/16* (2006.01)
*B64F 5/00* (2006.01)

(52) U.S. Cl.
CPC ............. *G01L 5/22* (2013.01); *B64F 5/0045* (2013.01); *G01B 21/16* (2013.01)

(58) Field of Classification Search
CPC ........... G01L 5/22; B64F 5/0045; G01B 21/16
USPC ............................. 73/802, 788, 852; 701/3, 4
See application file for complete search history.

(56) References Cited

U.S. PATENT DOCUMENTS

| | | | |
|---|---|---|---|
| 5,627,767 A * | 5/1997 | Gabiniewicz | G01L 5/22 701/102 |
| 6,053,052 A * | 4/2000 | Starostovic | G01N 3/20 73/851 |
| 7,933,691 B2 | 4/2011 | Pitt et al. | |
| 2005/0113975 A1* | 5/2005 | Seemann | B62D 55/00 700/245 |
| 2007/0173988 A1* | 7/2007 | Pitt | B64F 5/0045 701/10 |
| 2008/0148863 A1* | 6/2008 | Thompson | G01M 5/005 73/788 |
| 2011/0283806 A1* | 11/2011 | Buehler | G01N 3/12 73/788 |
| 2014/0182479 A1* | 7/2014 | Hafenrichter | B64F 5/0045 105/30 |
| 2014/0305217 A1* | 10/2014 | Tapia | B64F 5/0045 73/618 |

* cited by examiner

*Primary Examiner* — Lisa Caputo
*Assistant Examiner* — Jonathan Dunlap
(74) *Attorney, Agent, or Firm* — Nixon & Vanderhye P.C.

(57) ABSTRACT

Testing apparatus, systems and methods are provided to obtain measurements pertaining to aircraft control surfaces mounted to stationary aircraft structures for displacements about a hinge axis. A support structure and an actuator carried by the support structure may be provided, the support structure including attachment assemblies for positionally fixing the testing apparatus to the stationary aircraft structure. The actuator carried by the support structure includes a rectilinearly movable actuator shaft which contacts the aircraft control surface when the support structure is positionally mounted to the stationary aircraft structure. Actuation of the actuator will thereby cause the actuator shaft to apply a load to the movable aircraft control surface to cause deflection thereof about the hinge axis.

20 Claims, 3 Drawing Sheets

TESTING APPARATUS, SYSTEMS AND METHODS FOR STATICALLY DETERMINING FREE PLAY OF AIRCRAFT CONTROL SURFACES

FIELD

The embodiments disclosed herein relate generally to testing apparatus, systems and methods for obtaining measurements pertaining to aircraft surfaces, especially measurements pertaining to the free play and backlash characteristics of aircraft control surfaces.

BACKGROUND

The free play of an aircraft's control surfaces physically introduces decreased rigidity effects into the aeroelastic system. Such decreased rigidity effects attributable to such free play may in some cases be sufficiently large to cause limit cycle oscillations (LCO) in the surfaces that use surface rigidity to suppress flutter. The LCO can in turn reduce the aircraft fatigue life or, in certain extreme cases cause catastrophic failure. A free play test is therefore required to be conducted on an aircraft's control surfaces before an aircraft can be released for conducting a Flight Flutter Test (FFT) so that the free play is characterized and the aircraft safety is warranted.

Once the free play of a control surface is determined, according to the MIL 8870C standard (incorporated by reference hereinto), other tests are necessary in order to monitor free play evolution during the aircraft service life. These other monitoring tests of free play are known as backlash tests which are performed by the manufacturer before aircraft delivery and by the operators during aircraft service life.

In order In guarantee the aircraft safety, both the military and the FAA have published standards that define the amount of free play allowed on different aircraft control surfaces for the aircraft service life. In addition, these standards provide set points at intervals throughout the aircraft service life in which backlash must be tested.

Free play of an aircraft control surface can be tested statically or dynamically. Dynamic free play testing involves the placement of accelerometers in or on control surfaces with the surfaces thereafter being vibrated by shakers or actuators so that the free play can be monitored by a computer system. However, this type of dynamic free play testing system is generally applied to control surfaces of larger aircraft and allows for the correlation of the vibration frequency and the free play of the control surfaces which is not possible to obtain with smaller and medium sized aircraft. One such conventional dynamic free play testing system is known from U.S. Pat. No. 7,933,691 issued on Apr. 26, 2011 (the entire content of which is expressly incorporated hereinto by reference).

Because of the deficiency noted above with respect to dynamic testing, smaller and medium sized aircraft must have free play statically tested. Currently, however, static testing of the control surfaces is performed by applying a known load to the control surface and then measuring the corresponding deflection (linear measurement or angular displacement). In this regard, a typical static free play test is started a zero load and increased to some percentage of ultimate load. During testing, the moment or applied load is plotted versus displacement, i.e., to provide a L/D plot. For a control surface with no free play and a linear spring stiffness, the L/D plot is a straight line with the slope of the line being the measured spring stiffness. As free play is introduced into the system, a discontinuity in the curve occurs near the zero load range. For larger displacement values the slope increases and is more representative of the effective stiffness without the free play. As hysteresis is introduced into the system, the L/D plot forms a known type of curve.

The conventional static free play test method is timely, expensive and not very accurate. Moreover, the static test setup is relatively complex since the loading device must be fixed physically to the control surface without damaging the aircraft. Loading is typically executed with lead baskets of known mass which may in turn require certain system accommodations during each loading step thereby resulting in a very time consuming (and thus costly) process.

What has been needed therefore are improved systems and methods whereby static free play and backlash data may be obtained for control surfaces associated with small and medium sized aircraft. It is towards fulfilling such a need that the embodiments herein are directed.

SUMMARY

In general, the embodiments disclosed herein are directed toward testing apparatus, systems and methods for obtaining measurements pertaining to aircraft control surfaces mounted to stationary aircraft structures for displacements about a hinge axis. According to some embodiments, the testing apparatus may include a support structure and an actuator carried by the support structure. The support structure includes attachment assemblies for positionally fixing the testing apparatus to the stationary aircraft structure. The actuator carried by the support structure includes a rectilinearly movable actuator shaft which contacts the aircraft control surface when the support structure is positionally mounted to the stationary aircraft structure. Actuation of the actuator will thereby cause the actuator shaft to apply a load to the movable aircraft control surface to cause deflection thereof about the hinge axis.

A load cell may operatively be connected to the actuator shaft to sense applied loads to the aircraft control surface and output a load signal indicative thereof. A displacement transducer may also be operatively connectable to the aircraft control surface to output a deflection measurement signal indicative of the aircraft control surface.

Each of the attachment assemblies includes an adjustable stem and an attachment suction cup attached to an end of the stem for placement against a surface of the aircraft structure. Additionally or alternatively, the actuator may include an actuator suction cup attached to a terminal end of the actuator shaft for placement against a region of the aircraft control surface. A swivel joint may attach each of the attachment and/or actuator suction cups. A vacuum line may be attached operatively to each of the attachment and actuator suction cups and in turn attached to a vacuum source for drawing a vacuum within each of the attachment and actuator suction cups.

According to some embodiments, the displacement transducer may include a transducer support extending laterally of the transducer towards the aircraft structure for mounting the displacement transducer in an operative position relative to the aircraft control surface. At least one mounting foot may be provided with the transducer support for contacting the surface of the aircraft structure.

Systems for determining free play of a movable aircraft control surface mounted to a stationary aircraft structure for displacements about a hinge axis will include a testing apparatus as briefly described above, and a control system operatively connected to the testing apparatus. The control system thus receives the load and deflection signals from the load cell and displacement transducer, respectively, to provide a load versus displacement diagram therefrom and thereby determine free play of the aircraft control surface.

The free play of a movable aircraft control surface mounted to a stationary aircraft structure for displacements about a hinge axis may therefore be determined by positionally fixing the testing apparatus to a surface of the stationary aircraft structure such that the actuator shaft and the displacement transducer are in contact with respective regions of the movable aircraft control surface. The testing apparatus may be operatively connected to a control system to receive the bad and deflection measurement signals output by the bad cell and the displacement transducer, respectively. Operating the control system will thereby actuate the actuator and thus cause the actuator shaft to apply repetitive loads to the aircraft control surface.

Simultaneously with the actuation of the actuator, the bad and displacement measurement data associated with the repetitive applied loads are collected from the bad and deflection measurement signals output by the bad cell and the displacement transducer. A bad versus displacement curve based on the collected bad and displacement data may be determined from such collected data. The free play of the aircraft control surface may thereby be determined from the load versus displacement curve.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
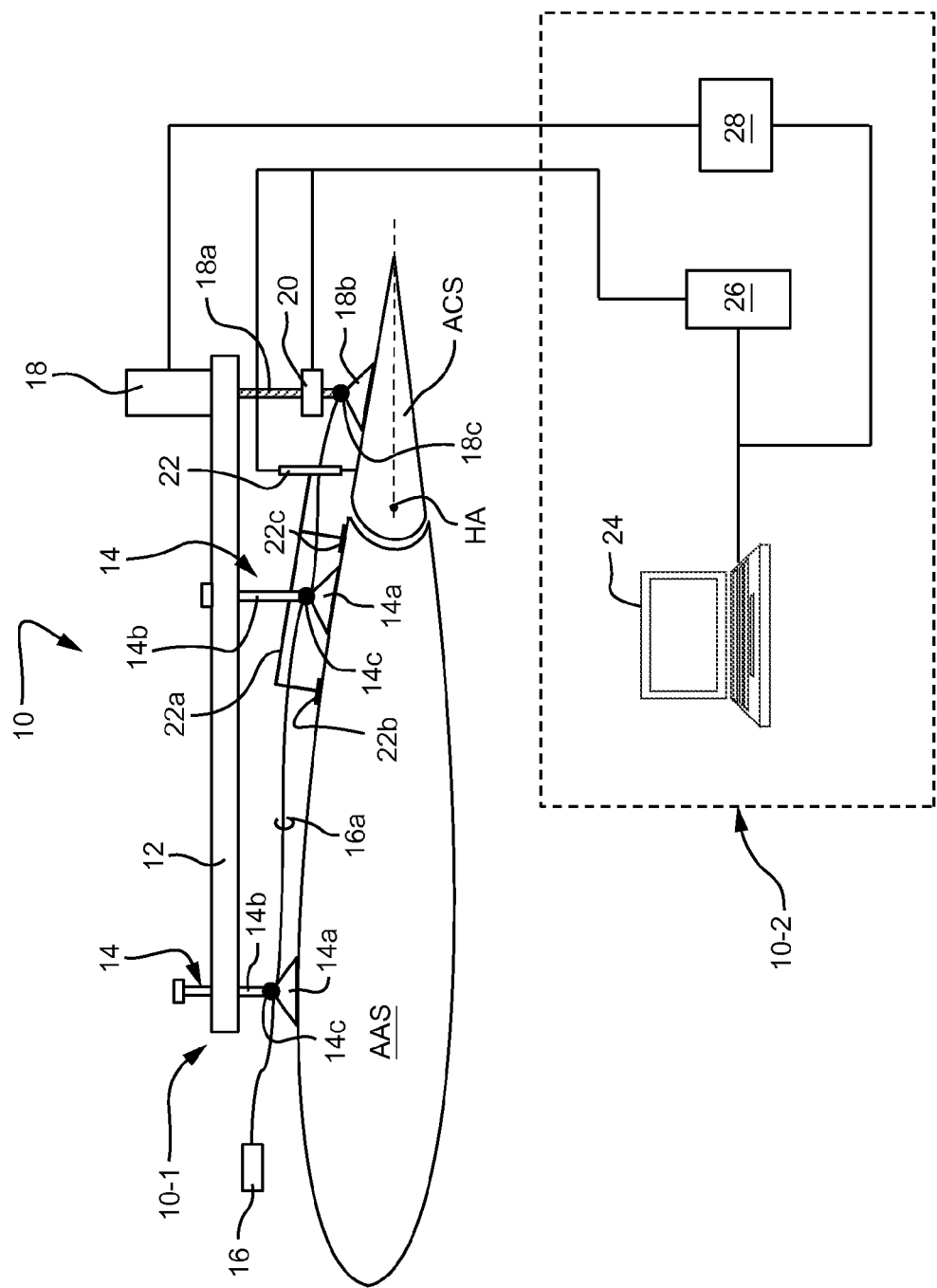
FIG. 1 is a schematic view of a system according to an embodiment disclosed herein for the static testing of free-play and backlash associated with an aircraft control surface.

Accompanying FIG. 1 schematically depicts a testing system 10 for statically testing free play and backlash of an aircraft control surface ACS which is operatively associated with an aircraft airfoil structure AAS. Specifically, the aircraft control surface ACS is capable of controllable deflections about a hinge axis HA relative to the stationary aircraft airfoil structure AAS. In general, the testing system 10 according to the embodiment depicted schematically in FIG. 1 includes an electromechanical testing assembly 10-1 physically and operatively attached to the aircraft control surface ACS and the aircraft airfoil structure AAS, and a control system 10-2 operatively connected to the testing assembly 10-1 to control the test parameters and collect the test data.

The testing assembly 10-1 is provided with a support structure 12 which includes a plurality of attachment assemblies 14 to physically attach the support structure 12 to the aircraft airfoil structure AAS. Each attachment assembly is provided with an attachment suction cup 14a connected to an adjustable stem 14b by a swivel connector 14c. The adjustable stem 14b is in turn coupled to the support structure 12 to allow it to be reciprocally linearly adjusted to allow its associated attachment suction cup 14a to be moved towards or away from the aircraft airfoil structure AAS. The stem 14b may in some embodiments be threadably connected to the support structure 12 to allow such adjustable movements. The swivel connector 12c assists to ensure proper positioning of the attachment suction cup 14a onto the curved airfoil surface of the aircraft airfoil structure AAS.

In such a manner therefore the attachment suction cups 14a associated with each of the stems 14b may be moved into direct physical contact in a slightly compressed state with the aircraft airfoil structure AAS so as to permit the support structure 12 to be mounted in a fixed spaced relationship thereabove. The attachment suction cups 14a are connected to a vacuum source 16 by vacuum lines 16a which operates to draw vacuum within the cups 14a to ensure that each is positionally fixed to the aircraft airfoil structure AAS and thereby provide positional stability to the support structure 12.

The support structure 12 supports an electrically operated actuator 18 having a rectilinearly movable actuator shaft 18a terminating with an actuator suction cup 18b. The actuator suction cup 18b is connected to the terminal end of the actuator shaft 18a by a swivel joint 18c in a manner similar to the attachment suction cups 14a and support stems 14b to allow a direct fixed connection between the suction cup 18b and the aircraft control surface ACS. The actuator suction cup 18b is likewise operatively connected to the vacuum source 16 by the vacuum line 16a. A load cell 20 is operatively associated with the actuator shaft 18a of the actuator 18 to sense the deflection forces during testing.

A linear displacement transducer 22 is provided with a lateral transducer support structure 22a with mounting feet 22b, 22c which allow for operatively positioning relative to the movable aircraft control surface ACS. In such a manner, the linear displacement transducer is fixed to the stationary aircraft airfoil structure AAS to allow the transducer 22 to be placed in operative contact with a portion of the movable aircraft control surface ACS. The extent of angular deflection of the movable aircraft control surface ACS relative to the stationary aircraft airfoil structure AAS during testing will therefore be sensed by the linear displacement transducer 22.

The control system 10-2 includes a conventional personal computer 24 having suitable non-volatile memory which may include data storage media, a data entry keyboard and a display. A data conditioner 26 is provided to collect the angular deflection data and the force data sensed by the load cell 20 and the linear displacement transducer 22 and transmitted thereto. The data conditioner 26 is operatively connected to the computer 24 so the conditioned data may be stored and/or further manipulated thereby. A servo-driver 28 operatively interconnects the transducer 18 and the computer 24.

Figure 2:
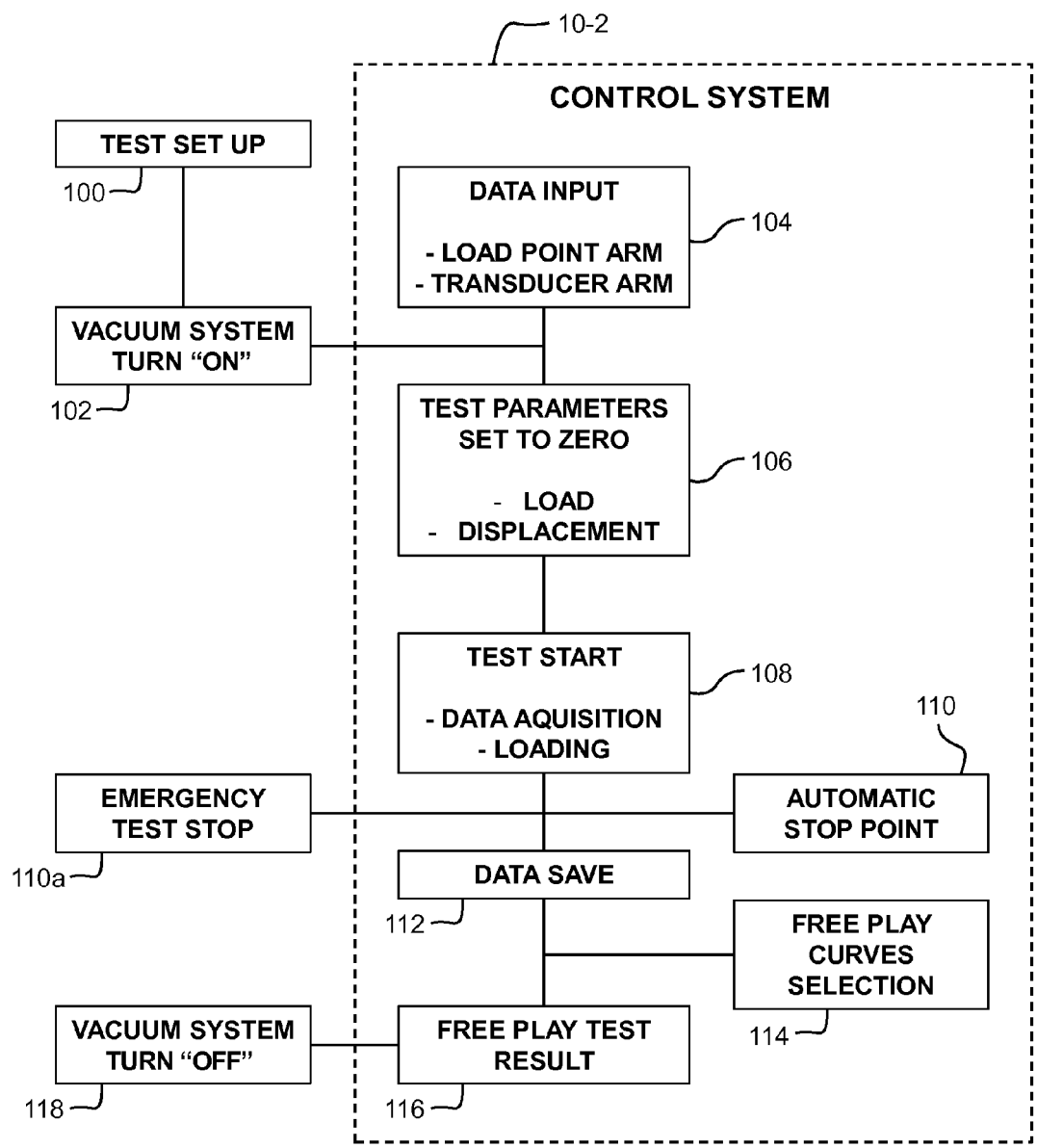
FIG. 2 is a schematic block flow chart diagram of an operational sequence that may be employed in the system depicted in FIG. 1.

Accompanying FIG. 2 is a block diagram depicting an exemplary operational procedure for conducting a free play and backlash test using the system shown in FIG. 1. In this regard, it will be observed in block 100 that the test will initially be set up for the particular movable aircraft control surface ACS being tested and involves the initial positioning of the testing assembly 10-1 relative to the movable aircraft control surface ACS and the stationary aircraft airfoil structure AAS. Once the testing assembly 10-1 has been properly positioned, the vacuum system including the vacuum source 16 is operated in step 102 to thereby positionally fix the testing assembly 10-1 relative to both the movable aircraft control surface ACS and the stationary aircraft airfoil structure AAS.

After setting up the test in step 100, data from the load point arms of the hinge axis of the aircraft control surface ACS is input into the computer 24 in step 104. The computer 24 comprises software stored in its non-volatile memory that manages the test and computes the free play. The computer 24 also allows the parameters (load and displacement) to be set to zero in step 106 before the start of the actual free play test. Following step 106, the free play test may be started in step 108. In this regard, the computer 24 executes a loading command via the servo-driver 28 and the data acquisition for three subsequent repetitions is obtained via the data conditioner 26. The loading command thus causes the transducer 18 to operate so that compression and tension forces are sequentially exerted onto the movable aircraft control surface ACS by means of the actuator shaft 18*a* and the suction cup 18*b*. The resistance forces acting in response to these compression and tension forces are thus sensed by the transducer 20 and acquired simultaneously with the angular deflection data sensed by the displacement transducer 22. Both the loading and the data acquisition are performed in a continuous manner over a specified cycle time which increases the test speed with no detrimental effects on the data quality.

According to one embodiment, after the third repetitive loading and data acquisition cycle is completed, the computer 24 automatically stops the test and the data acquisition in step 110. However, at any time during testing the loading and data acquisition cycles may be stopped in step 110*a* should there be a need.

Figure 3:
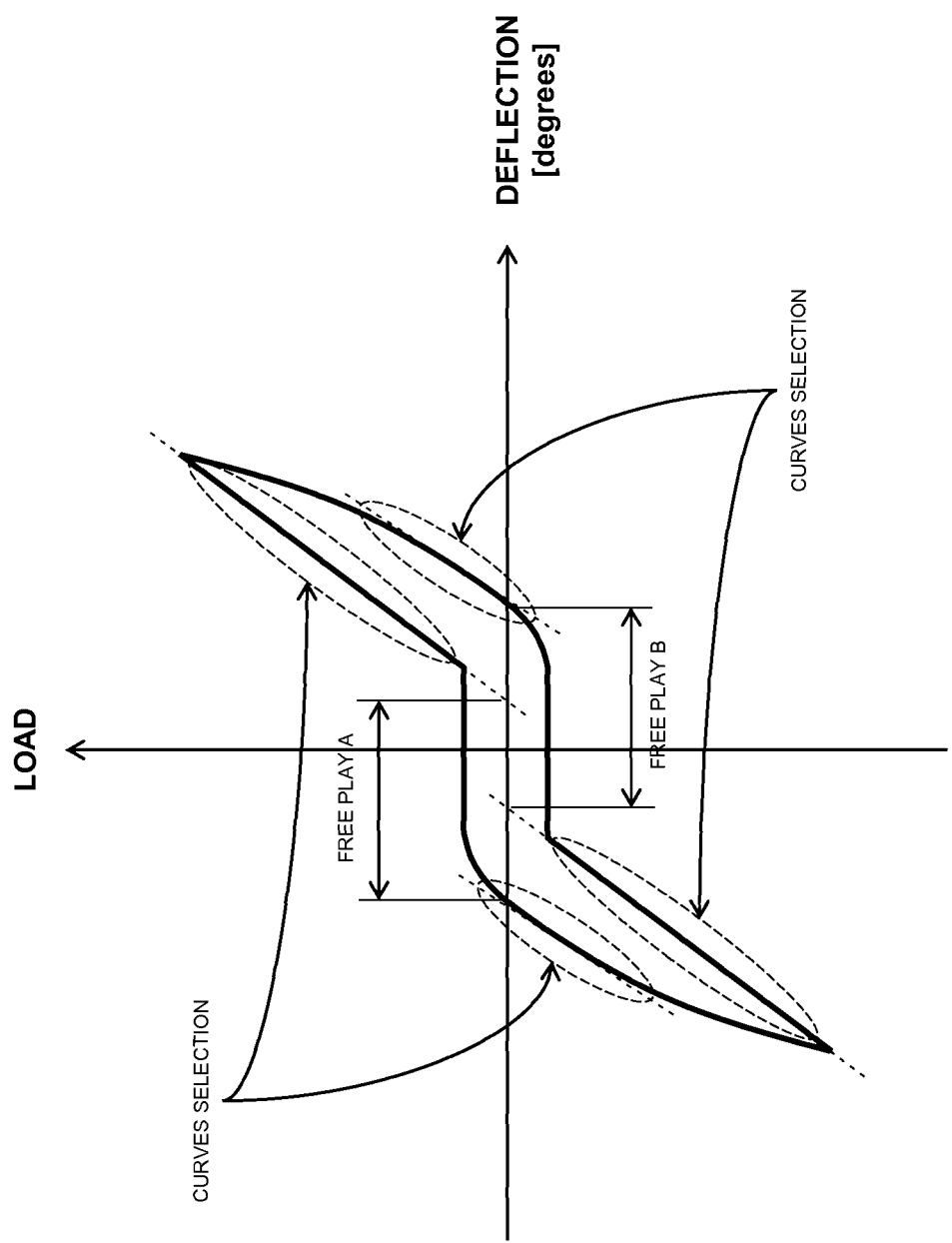
FIG. 3 is an exemplary Load-Deflection data plot that may be obtained with the system depicted in FIG. 1.

Data is saved from the test in step 112 and a load versus deflection (L/D) curve is obtained as depicted in accompanying FIG. 3. The L/D curve or parts of the L/D curve are then selected in step 114 by fitting a tangent line to each of the associated upper and lower curve parts associated with each of the tension and compression force cycles. Free play may then be computed by algorithms stored in the computer 24, specifically by computing the difference of the derivatives of the upper (tensile loading—Free Play A) and lower (compression loading—Free Play B) loading curves as shown in FIG. 3. The free play for the tested aircraft control surface ACS is considered to be the greatest value obtained from the calculation and is thereby input as the free play test result in step 116.

Following the determination of the free play test result, the vacuum system, including the vacuum source 16, may be turned off in step 118 and the testing assembly 10-1 removed from the aircraft airfoil structure AAS and the aircraft control surface ACS and reattached to other similar structures for testing.

It will be understood that the description provided herein is presently considered to be the most practical and preferred embodiments of the invention. Thus, the invention is not to be limited to the disclosed embodiments, but on the contrary, is intended to cover various modifications and equivalent arrangements included within the spirit and scope thereof.

What is claimed is:

1. A static free play testing apparatus for determining free play of a moveable aircraft control surface which is mounted to a stationary aircraft structure for displacements about a hinge axis, wherein the testing apparatus comprises:
    an elongate support structure having opposed first and second ends;
    first and second attachment assemblies operatively associated with the support structure for removably positionally fixing the support structure to the stationary aircraft structure, wherein
        (i) the first attachment assembly is positioned at the first end of the elongate support structure for positional fixation to the stationary aircraft structure, and the second attachment assembly is spaced from the first attachment assembly toward the second end of the support structure for positional fixation to the stationary aircraft structure adjacent to the moveable aircraft control surface, and wherein
        (ii) each of the first and second attachment assemblies comprise an adjustable stem connected to the support structure for allowing linear adjustments of the stem, and a suction CUP attached to a terminal end of the stem for placement against a surface of the stationary aircraft structure;
    an actuator carried by the second end of the support structure, the actuator having a rectilinearly moveable actuator shaft which extends from the actuator at the second end of the support structure and contacts the moveable aircraft control surface when the support structure is removably positionally fixed to the stationary aircraft structure by the first and second attachment assemblies, wherein actuation of the actuator causes the actuator shaft to sequentially apply compression and tension loads the moveable aircraft control surface to cause respective deflections thereof about the hinge axis;
    a load cell operatively connected to the actuator shaft for sensing the sequentially applied compression and tension loads to the aircraft control surface and outputting a signal indicative of resistance forces thereto, and
    a displacement transducer having a transducer support that is capable of being removably fixed to the stationary aircraft structure, the displacement transducer being positioned in operative contact with the moveable aircraft control surface to output a deflection measurement signal indicative of the moveable aircraft control surface in response to movement of the moveable aircraft control surface by the sequential application of the compression and tension loads.

2. The testing apparatus according to claim 1, wherein the actuator includes an actuator suction cup attached to a terminal end of the actuator shaft for placement against a region of the moveable aircraft control surface.

3. The testing apparatus according to claim 2, further comprising a vacuum line attached operatively to each of the attachment and actuator suction cups.

4. The testing apparatus according to claim 3, further comprising a vacuum source connected to the vacuum line for drawing a vacuum within each of the attachment and actuator suction cups.

5. The testing apparatus according to claim 2, wherein the actuator further includes a swivel joint connecting the actuator suction cup to the terminal end of the actuator shaft.

6. The testing apparatus according to claim 1, wherein each of the attachment assemblies further includes a swivel joint connecting the attachment suction cup to the terminal end of the adjustable stem.

7. The testing apparatus according to claim 1, wherein the displacement transducer is positioned in contacting relationship adjacent to the moveable aircraft control surface, and wherein the transducer support extends laterally of the transducer towards the stationary aircraft structure.

8. The testing apparatus according to claim 7, wherein the transducer support includes at least one mounting foot for contacting the surface of the stationary aircraft structure.

9. A system for determining free play of a moveable aircraft control surface mounted to a stationary aircraft structure for displacements about a hinge axis, wherein the system comprises:
 a testing apparatus according to claim 1, and
 a control system operatively connected to the testing apparatus to receive the load and deflection signals from the load cell and displacement transducer, respectively, to provide a load versus displacement diagram therefrom and thereby determine free play of the aircraft control surface.

10. The system according to claim 9, wherein the actuator includes an actuator suction cup attached to a terminal end of the actuator shaft for placement against a region of the aircraft control surface.

11. The system according to claim 10, further comprising a vacuum line attached operatively to each of the attachment and actuator suction cups.

12. The system according to claim 11, further comprising a vacuum source connected to the vacuum line for drawing a vacuum within each of the attachment and actuator suction cups.

13. The system according to claim 9, wherein the actuator includes an actuator suction cup attached to a terminal end of the actuator shaft for placement against a region of the aircraft control surface.

14. The system according to claim 13, further comprising a vacuum line attached operatively to the actuator suction cup.

15. The system according to claim 14, further comprising a vacuum source connected to the vacuum line for drawing a vacuum within the actuator suction cups.

16. The system according to claim 13, wherein the actuator further includes a swivel joint connecting the actuator suction cup to the terminal end of the actuator shaft.

17. The system according to claim 9, wherein each of the attachment assemblies further includes a swivel joint connecting the attachment suction cup to the end of the stem.

18. The system according to claim 9, wherein the displacement transducer is positioned in contacting relationship adjacent to the moveable aircraft control surface, and wherein the transducer support extends laterally of the transducer towards the stationary aircraft structure.

19. The system according to claim 18, wherein the transducer support includes at least one mounting foot for contacting the surface of the aircraft structure.

20. A method for determining free play of a moveable aircraft control surface mounted to a stationary aircraft structure for displacements about a hinge axis, the method comprising:
 (a) positionally fixing a testing apparatus according to claim 1 to a surface of the stationary aircraft structure such that the actuator shaft the displacement transducer are in contact with respective regions of the moveable aircraft control surface;
 (b) connecting the testing apparatus operatively to a control system to receive the load and deflection measurement signals output by the load cell and the displacement transducer, respectively;
 (c) operating the control system to actuate the actuator and thereby cause the actuator shaft to apply repetitive loads to the aircraft control surface; and
 (d) during step (c), collecting load and displacement measurement data associated with the repetitive applied loads from the load and deflection measurement signals output by the load cell and the displacement transducer;
 (e) plotting a load versus displacement curve based on the collected load and displacement data; and
 (f) determining free play of the aircraft control surface from the load versus displacement curve.

* * * * *